(12) United States Patent
Brackmann

(10) Patent No.: US 8,289,406 B2
(45) Date of Patent: Oct. 16, 2012

(54) IMAGE STABILIZATION DEVICE USING IMAGE ANALYSIS TO CONTROL MOVEMENT OF AN IMAGE RECORDING SENSOR

(75) Inventor: Ludwig Brackmann, Bonn (DE)

(73) Assignee: Deutsche Telekom AG, Bonn (DE)

( * ) Notice: Subject to any disclaimer, the term of this patent is extended or adjusted under 35 U.S.C. 154(b) by 1051 days.

(21) Appl. No.: 11/226,014

(22) Filed: Sep. 14, 2005

(65) Prior Publication Data

US 2006/0061660 A1 Mar. 23, 2006

(30) Foreign Application Priority Data

Sep. 18, 2004 (DE) .................. 10 2004 045 430

(51) Int. Cl.
*H04N 5/228* (2006.01)

(52) U.S. Cl. .................................... 348/208.7

(58) Field of Classification Search ............. 348/208.99, 348/208.1, 208.2, 208.3, 208.4, 208.5, 208.7
See application file for complete search history.

(56) References Cited

U.S. PATENT DOCUMENTS

| 5,030,984 | A | | 7/1991 | Buckler et al. ............... 354/430 |
| 5,818,954 | A | * | 10/1998 | Tomono et al. ............... 382/115 |
| 5,973,733 | A | * | 10/1999 | Gove .......................... 348/208.13 |
| 6,992,700 | B1 | * | 1/2006 | Sato et al. .................. 348/208.2 |
| 7,079,707 | B2 | * | 7/2006 | Baron ............................ 382/289 |
| 7,307,653 | B2 | * | 12/2007 | Dutta .......................... 348/208.7 |
| 2002/0080242 | A1 | | 6/2002 | Takahashi et al. |
| 2003/0067544 | A1 | | 4/2003 | Wada |
| 2003/0076421 | A1 | | 4/2003 | Dutta |
| 2003/0152251 | A1 | * | 8/2003 | Ike ................................. 382/117 |
| 2005/0057659 | A1 | * | 3/2005 | Hasegawa ............... 348/208.11 |
| 2005/0063610 | A1 | * | 3/2005 | Wu et al. ..................... 382/294 |
| 2005/0163348 | A1 | * | 7/2005 | Chen ............................. 382/107 |

FOREIGN PATENT DOCUMENTS

| DE | 199 42 900 | 5/2000 |
| EP | 0 498 730 | 8/1992 |
| EP | 0 956 695 | 11/2002 |
| EP | 1304872 | 4/2003 |
| EP | 1377040 | 1/2004 |
| JP | 02058481 | 2/1990 |
| JP | 09261524 | 10/1997 |
| JP | 10191144 | 7/1998 |
| JP | 11225284 | 8/1999 |
| JP | 2000069351 | 3/2000 |
| JP | 2000069353 | 3/2000 |
| WO | WO-9912355 | 3/1999 |
| WO | WO-0237179 | 5/2002 |

* cited by examiner

*Primary Examiner* — Albert Cutler
(74) *Attorney, Agent, or Firm* — Leydig, Voit & Mayer, Ltd.

(57) ABSTRACT

An image stabilization device includes a number of micromechanical actuators, an image recording sensor, and a computational device. The image sense generates image data of an image and is suspendedly mounted to the micromechanical actuators. The computational device receives and processes the image data generated by the image recording sensor. The computational device includes a detection device for detecting shake so as to perform an image analysis on the image data and detect changes in a time sequence of the image data. The detected changes are used to generate control signals for controlling the micromechanical actuators so as to mechanically move the image recording sensor in a manner to counteract the shake and to stabilize the image.

21 Claims, 3 Drawing Sheets

IMAGE STABILIZATION DEVICE USING IMAGE ANALYSIS TO CONTROL MOVEMENT OF AN IMAGE RECORDING SENSOR

Priority is claimed to German patent application no. DE 10 2004 045 430.2, the entire subject matter of which is hereby incorporated by reference herein.

The present invention relates to an image stabilization device in general, and in particular to an image stabilization device having means for image analysis and shake compensation.

BACKGROUND

The recording of moving images is becoming more and more popular. Cameras having image sensors with CCD technology (CCD: charged coupled devices) have provided a breakthrough in this field. In particular, such camera systems are becoming increasingly smaller and lighter. This has made it possible to install photo or video cameras in mobile telephones, so that mass use of video telephony, for example, for video conferencing, has come within reach. With the introduction of the code multiplexing method (UMTS), this application in the field of moblie radio communications received a new boost.

However, the practical implementation involves some difficulties. In order to record one's own face, mobile telephones are typically held with one hand and with the arm half extended. This position, especially in conjunction with the small size and low weight of the mobile telephone, makes it particularly difficult to hold the mobile telephone still so as to ensure video transmission with little blur. Especially during mobile phone video conferencing, it is a problem when the camera movements and the speaker movements are different and the image is therefore blurred. Even slight, often unconscious movements of the hand or of the head already cause noticeable shaking of the image to be transmitted. However, blurred video transmission significantly reduces the perceived quality.

Several shake compensation systems are already known from video camera applications.

Document EP 04 98 730 A2, for example, describes a video signal processing apparatus which can be used in a video camera in conjunction with a device for compensating for vibrations caused by the hand. This apparatus is provided with means that generate a motion vector representing an amount and direction of motion between consecutive frames of a video signal.

The described apparatus further has means capable of deciding whether or not the determined motion vector represents an unwanted movement of the camera. Also provided is a device for generating correction or control signals as a function of the determined motion vector to allow unwanted movement of the camera to be compensated for.

However, the motion vector determination is still in need of improvement in terms of the requirements for mobile radio communications and the recording of faces with their specific features.

U.S. Pat. No. 5,030,984 discloses a device which detects the motion in a scene by sampling the change in intensity of light of consecutive images at each pixel site in the image along with the change in intensity of light of a neighboring pixel site. These changes are then used to calculate both the displacement of the entire image and a directional degree of image change. Finally, a signal representing the total displacement is calculated and used, inter alia, to control the movement of a film in a direction in order to minimize blur in the recorded image.

Another document, EP 0 956 695 B1, discloses a motion sensor, which performs analysis on a plurality of images and determines a scene-motion parameter therefrom. The calculation unit, in this document also referred to as "motion sensor", can be part of an image stabilization system. According to the description, the most practical technique is to analyze two sequential, successive fields or frames to determine the scene-motion parameter.

All of these systems operate fully electronically, so that, typically, part of the potential resolution is sacrificed for the sake of stabilization. This is because, in electronic image stabilization, it is common practice today to use unused edge pixels of the CCD image converter to detect movements of the video or photographer and to subsequently compensate for them mathematically. As in the case of many electronic aids, such as digital zoom or pixel interpolation, this results in a more or less significant loss in quality. This may not be perceived as too great a disadvantage in high-resolution systems.

But particularly in video telephones, the reasonably transmittable image resolution and repetition rate are significantly lower, in spite of the constantly increasing data transfer rates. Yet, it is especially in the case of mobile telephones that there are, on the one hand, extreme demands on size and, on the other hand, enormous cost pressure, so that the cheapest possible, low-resolution CCD chips are used. In this connection, typical resolutions of a video telephone may be in the range of VGA.

It is therefore desirable to have an image stabilization system that, other than digital image editing, substantially retains the resolution of the image recording sensor.

Optical image stabilization is mainly used in binoculars, video cameras and miniature camera lenses. The movements of the user are detected by so-called "gyroscopes". Gyroscopes are devices capable of detecting motions about the horizontal and vertical axes. Once the camera or the lens system detects the direction in which the pick-up lens is moving, a special refractive lens, which is mostly supported in a liquid, is almost simultaneously moved in exactly the opposite direction, so that camera shake is largely compensated for.

Document DE 199 42 900 B4, for example, discloses a device for correcting image defects caused by camera shake. Three pairs of acceleration sensors are provided to detect camera shake in the horizontal and vertical directions as well as rotation. The correction signals supplied by the acceleration sensors are fed to multilayer piezoelectric actuators, which are connected to a CCD sensor. Using the multilayer piezoelectric actuators, the CCD sensor can be displaced in the X-direction and in the Y-direction, which disadvantageously allows only limited correction. On the other hand, the use of six acceleration sensors appears to be cumbersome, complex, and space-intensive.

To compensate for unwanted rotation of the camera body, there is also provided a rotary member, for example, in the form of a rotary shaft, which cooperates with a multilayer piezoelectric actuator. However, a rotary shaft involves a high degree of constructional complexity, is prone to failure, and, at best, poorly suited for applications with tight spatial constraints, such as in mobile telephones.

Disadvantageously, however, this technology does not provide for compensation for subject or object shake.

These systems, which have been developed for video cameras, which are large in size compared to a mobile telephone, can generally not be easily applied to a mobile telephone because of the extreme space constraints. Moreover, the stability requirements in mobile telephones are generally higher than in cameras, which are typically handled with more care and attention.

SUMMARY OF THE INVENTION

It is therefore an object of the present invention to provide a simple, inexpensive and compact image stabilization device that uses the resolution of the image recording sensor to the best possible extent without having to resort to mechanical gyro sensors.

Another, alternative, object of the present invention is to provide an image stabilization device which uses the advantages of image recognition also to compensate for object motion.

It is a further, alternative, object of the present invention to provide such a device which is suitable, in particular, for installation in hand-holdable mobile video telephones and which can be inexpensively produced in large quantities.

An additional, alternative, object of the present invention is to provide such a device that is capable of compensating for a long shaking stroke.

It is yet another, alternative, object of the present invention to provide such a device that avoids or at least reduces the disadvantages of known devices.

The present invention provides a device for electronic image stabilization of electronic image data or video image data using digital image analysis; the device being able to be used, for example, in hand-holdable mobile video telephones. Such mobile video telephones are understood to include not only classic cell phones, but also the so-called "personal digital assistants" (PDAs), "mobile digital assistants" (MDAs), and other mobile devices which allow for video transmission and which may be prone to shake due to the characteristic of being hand-held by a user.

The device includes an image recording sensor, preferably a CCD chip, for recording, i.e., generating the video image data, a computational device, such as a digital microcomputer, which receives and processes the digital video image data from the image recording sensor. The computational device further includes detection means which are designed to detect shake in the sequence of video images such that an image analysis and image recognition, in particular face recognition, are performed on the video image data, and changes in the time sequence of the video image data are detected by the detection means. The detection means are designed, in particular, as electronic and/or digital detection means and are preferably implemented by suitably designed hardware or suitably programmed software, for example, image recognition software. This digital electronic image analysis has the advantage of eliminating the need for mechanically complex and sensitive gyro sensors. This makes the device insensitive to failure, and allows it to have very small dimensions. Moreover, it is also possible to detect object motion.

The detected image changes are used to generate control signals for controlling a compensating device. The compensating device compensates or at least reduces the shake. To this end, the compensating device is provided with a plurality of electro-micromechanical actuators which the image recording sensor is suspendedly mounted to. The control signals are preferably electrical control signals which are used to control the micromechanical actuators in such a manner that the image recording sensor is mechanically moved by the actuators so as to counteract the shake and to thereby stabilize the video image data. Thus, the image recording sensor is automatically and preferably continuously moved in a direction opposite to the shaking movements of the camera and of the object in order to compensate for the shake.

In comparison with the software compensation often used in the prior art, this mechanical compensation has the advantage that no edge pixels must be sacrificed, so that the full resolution of the CCD chip can be used even when the shake compensation is in operation. In expensive and complex high-resolution video cameras, the loss of a few edge pixels may at first not appear to be too serious to one skilled in the art, but it is a particular disadvantage for use in mobile telephones, because, unlike video cameras, mobile telephones frequently have a lower resolution, for example, in VGA quality, anyway. Of course, the device may also be used for photo or video cameras.

Preferably, the plurality of actuators includes a first and/or a second group of actuators, or, in particular, is divided into two groups of actuators; the actuators of the first group running transversely or perpendicularly to the actuators of the second group. The preferably linearly acting actuators of the first group are used to tilt the image recording sensor in a direction transverse to the normal of the image plane (optical axis) in order to compensate for tilts of the camera caused by the user and/or by object motion in a direction transverse to the optical axis in two dimensions (X- and Y-directions), i.e., two degrees of freedom. Tilting is particularly suitable for the structural and optical conditions of a video telephone, because the tilting of the image recording sensor advantageously allows for a relatively long stroke, and thus, for effective shake compensation.

Moreover, the actuators of the second group are used to rotate the image recording sensor about the optical axis of the image recording sensor in order to compensate for corresponding rotations about the optical axis, i.e., with respect to a third degree of freedom.

This independent control of the actuators of the first and second groups with respect to the three degrees of freedom allows for particularly effective shake compensation.

Preferably, the actuators of the first group are designed to perform a linear movement along a longitudinal axis and arranged with their longitudinal axes transverse or substantially perpendicular to the image plane of the image recording sensor in order to tilt the image recording sensor in a direction transverse to the normal of the image plane.

In an embodiment of the present invention, the actuators of the first group are mounted and attached to the back side of the image recording sensor opposite the optically active side. In an embodiment, the actuators of the first group are integrated into the CCD chip on the back side of the CCD chip. This allows for a small size and inexpensive mass production, which in turn is an advantage especially in the highly competitive market for video telephones.

It has turned out to be advantageous for the first group to consist of exactly three actuators, which form a tripod located on the back side of the image recording sensor. Advantageously, there is no need for disturbing elements on the front side of the sensor, and the tripod allows for easy, two dimensional tilting of the image recording sensor in a direction transverse to the normal of the image plane.

In accordance with another embodiment of the present invention, the actuators of the second group are designed to perform a linear movement along a longitudinal axis and arranged with their longitudinal axes transverse to the normal of the image plane or substantially parallel to the image plane of the image recording sensor in order to rotate the image recording sensor about the normal of the image plane. Preferably, the actuators of the first and second groups are controlled independently of each other and produce movements which are substantially independent of those of the respective other group.

The image recording sensor, or CCD chip, preferably defines side surfaces that extend transversely to the image plane, the actuators of the second group being suspendedly mounted to the side surfaces.

In an embodiment, the image recording sensor has a substantially rectangular shape in its image plane, and the second group consists of four actuators, which are each suspended at the end of a side surface and which extend with their respective longitudinal axes parallel to an adjacent side surface; the actuators of the second group being used to bi-directionally rotate the image recording sensor about the normal of the image plane. To this end, the image recording sensor is preferably located in a housing and is movably and suspendedly mounted within and to the housing via the actuators.

The above-described arrangement is advantageous because the actuators of the first and/or second groups can be implemented by linearly acting piezoelectric elements which are each directly controlled and driven by a respective electrical control signal.

The detection means are preferably designed such that they determine differential angles from the time sequence of the video image data, and that a distinction is made between wanted and unwanted movements based on the size of the differential angles and predefined decision criteria. Subsequently, the movements defined as unwanted can be compensated for to the extent possible; the movements defined as wanted remaining uncompensated Moreover, the detection means are preferably digital electronic detection means, for example, suitable software that is designed to perform face recognition.

For face recognition, it is preferred to perform at least recognition of a plurality of prominent facial features selected from the group including the eyes, nose, and mouth of a face. To this end, each recognized facial feature (eyes, nose, mouth, etc.) is assigned a point of reference. Subsequently, each point of reference can be used as a reference point, or a central point, such as a centroid, is calculated from several, in an embodiment three, points of reference and used as a reference point for each individual image. Using this/these reference point(s), the image stabilization performed by continuously tracking the reference point(s) in the video image data.

In the following, the present invention will be explained in more detail on the basis of exemplary embodiments and with reference to the drawings. Identical or similar parts are partly provided with the same reference numerals, and the features of the various exemplary embodiments may be combined with one another.

DETAILED DESCRIPTION

Figure 1:
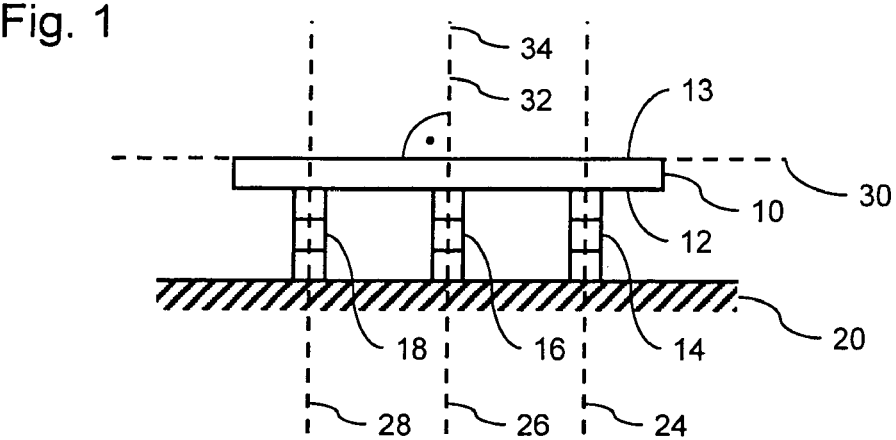
FIG. 1 is a schematic side view of the device according to a first embodiment of the present invention.

FIG. 1 shows an image recording sensor in the form of a CCD chip 10 having three actuators 14, 16, 18 arranged on and mounted to back side 12 thereof. Actuators 14, 16, 18 connect CCD chip 10 to a housing wall 20. Back side 12 is opposite the optically active front side 13 of CCD chip 10.

Micromechanical actuators 14, 16, 18 are formed by piezoelectric elements which each contract or expand along their longitudinal axes 24, 26, 28, which are perpendicular to image plane 30 of CCD chip 10, in order to tilt CCD chip 10 relative to the rest normal 32 of image plane 30. The integration of piezoelectric actuators 14, 16, 18 into CCD chip 10 on back side 12, as well as the attachment of the piezoelectric actuators of the second group to the side surfaces of CCD chip 10 permits inexpensive mass production. FIG. 1 shows the CCD chip in its rest position, in which it extends parallel to housing wall 20.

Figure 2:
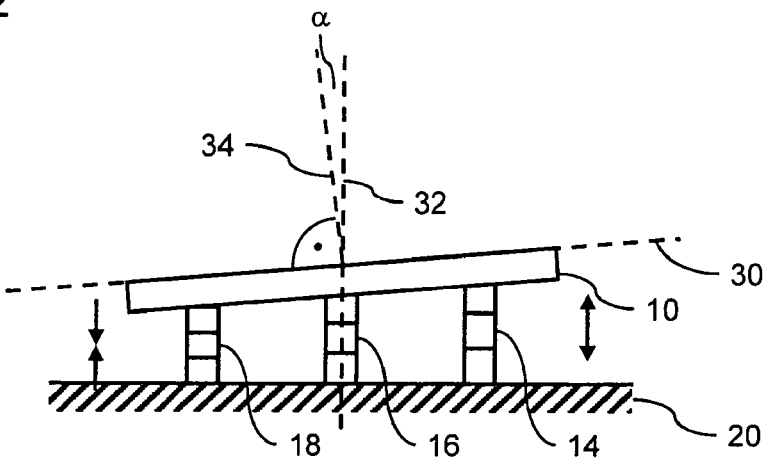
FIG. 2 shows the device of FIG. 1 in a tilted position.

Referring to FIG. 2, CCD chip 10 is shown in a tilted position. In this tilted position, the current normal 34 of image plane 30 forms an angle α with rest normal 32.

The tilting is achieved by expansion of linear piezoelectric actuator 14 and simultaneous contraction of linear piezoelectric actuator 18.

Figure 3:
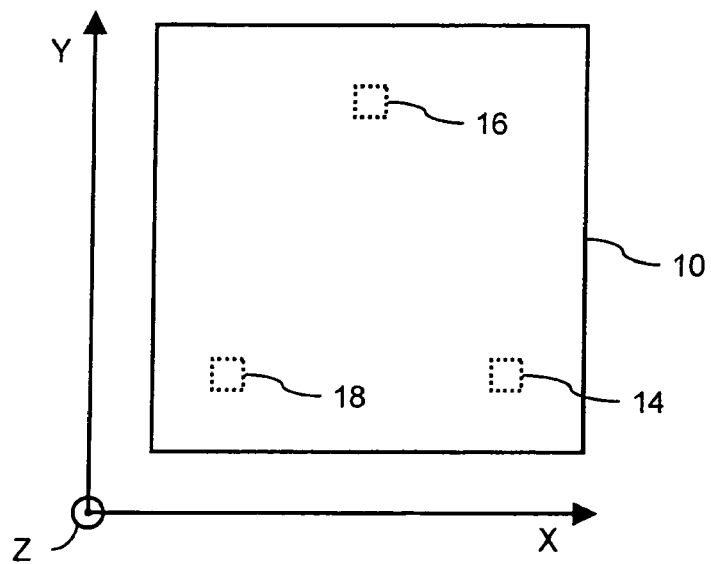
FIG. 3 is a transparent top view of the device of FIG. 1.

Referring to FIG. 3, the triangular or tripod arrangement of the three piezoelectric actuators 14, 16, 18 is shown, which is used to effect two-dimensional tilting about the X-axis and the Y-axis, which define the image plane in the rest position.

Figure 4:
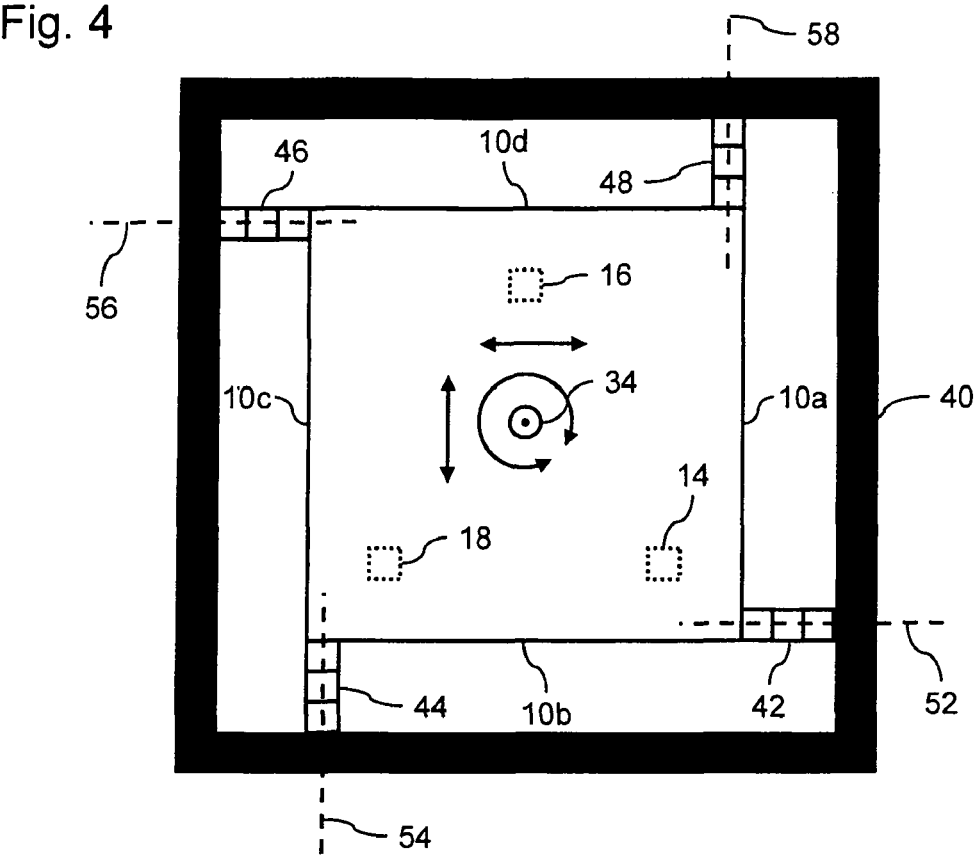
FIG. 4 is a transparent top view of the device according to a second embodiment of the present invention.

Referring to FIG. 4, rectangular CCD chip 10 is suspended in a surrounding housing 40 via four further actuators 42, 44, 46, 48 in the form of linear piezoelectric actuators within housing 40.

Accordingly, piezoelectric actuators 14, 16, 18 form a first group of actuators, which are used to tilt CCD chip 10, and piezoelectric actuators 42, 44, 46, 48 form a second group used to rotate CCD chip 10 about its normal 34, which, in this view, extends perpendicular to the image plane.

The piezoelectric actuators of the second group are secured on one side to the ends of sides 10a, 10b, 10c, 10d, respectively, and on the other side to the inner sides of housing 40. Longitudinal axis 52 of piezoelectric actuator 42 extends parallel to adjacent side surface 10b. The remaining actuators of the second group are correspondingly arranged at the other sides.

Figure 5:
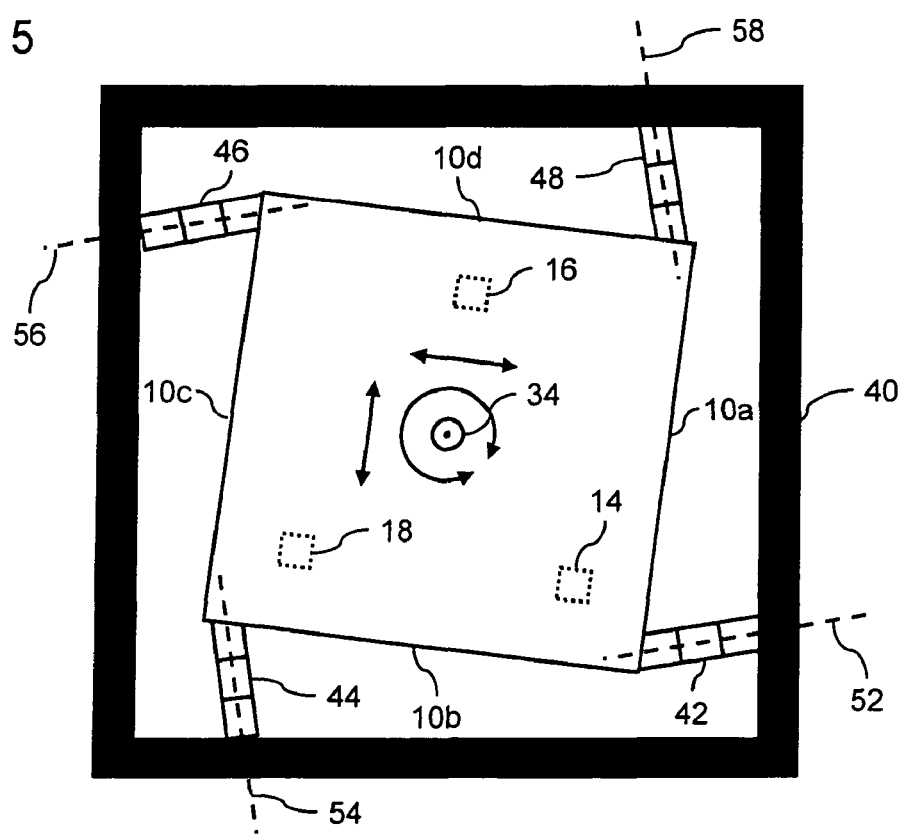
FIG. 5 is a transparent top view showing the device of FIG. 4 in a rotated position.

Referring to FIG. 5, CCD chip 10 is shown rotated about its normal 34 of image plane 30 as compared to the view of FIG. 4. The rotation is achieved by simultaneous expansion of all four actuators 42, 44, 46, 48 of the second group. This does indeed result in a slight twisting of actuators 14, 16, 18 of the first group, but does not significantly affect the function of the actuators of the first group.

As can be seen in FIG. 5, independent control of the actuators of the first group and of the second group produces a two-dimensional tilting motion about the X-axis and about the Y-axis, and/or a rotation about the Z-axis formed by normal 34. Due to the smallness of the tilt and rotation angles, the motion about the three axes mentioned above can be regarded, to a good approximation, as being independently controlled. In particular, both a movement of the object and of the camera can be compensated for by a single control signal per actuator. Because of this, by selective operation or control of the individual piezoelectric actuators, CCD chip 10 can be oriented in almost any desired direction, and thus, the unwanted movement of the camera can be compensated for, and the image stabilization is capable of effectively compensating for a plurality of different shaking movement patterns.

Figure 6:
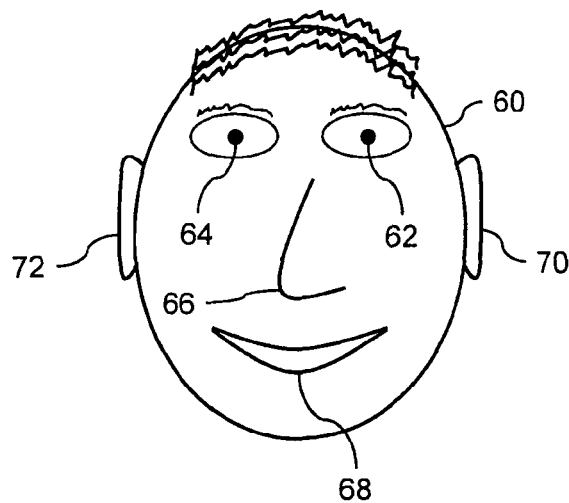
FIG. 6 is a schematic representation of a human face.

Referring to FIG. 6, a face 60 including eyes 62, 64, a nose 66, a mouth 68 and two ears 70, 72 is schematically shown as an example of an object.

Figure 7:
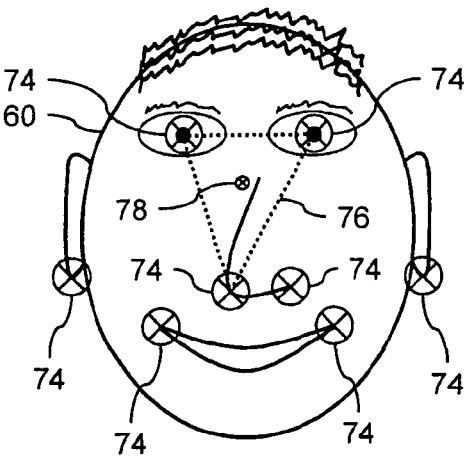
FIG. 7 shows the face of FIG. 6 with a plurality of points of reference.

Referring to FIG. 7, several prominent facial elements are each assigned a point of reference 74 by a digital electronic computational device in the form of a microcomputer after a suitable image recognition, which is generally known to one skilled in the art. The computational device, or more precisely, suitably programmed software calculates a polygon, in this example a triangle 76, from several, preferably three, of the points of reference. In this example, the triangle is formed by the points of reference 74 of the two eyes 62, 64, and of nose tip 66 as particularly prominent facial elements. Subsequently, the centroid 78 of triangle 76 is calculated and established as a reference point for the image stabilization.

Figure 8:
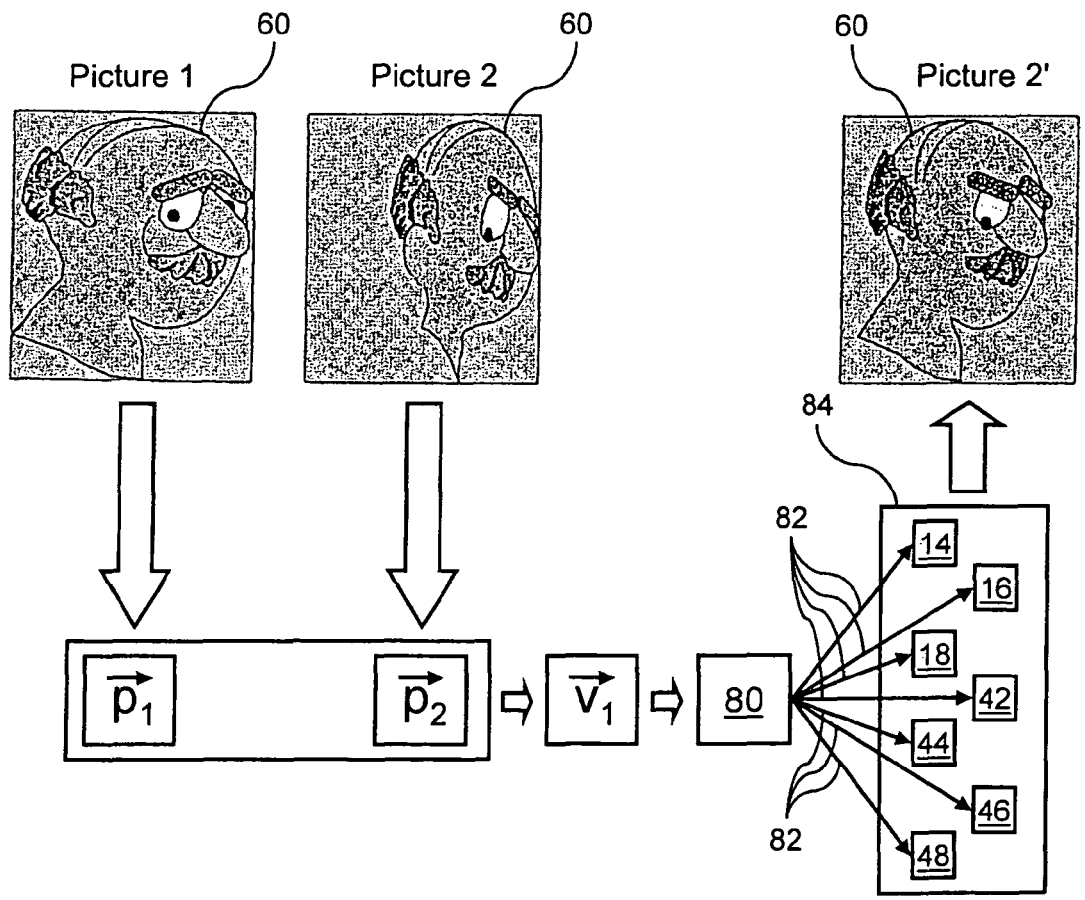
FIG. 8 is a block-like diagram of the process sequence for the image stabilization according to the present invention.

Referring to FIG. 8, initially, image 1 of the video image data stream is recorded, and position vector $\vec{P}_1$ of reference point 78 is determined. Subsequently, next image 2 of the video image data stream is recorded, and position vector $\vec{P}_2$ of reference point 78 is established. A displacement vector $\vec{v}_1$ is determined, for example, by simply subtracting the two position vectors $\vec{P}_1$ and $\vec{P}_2$. Displacement vector $\vec{v}_1$ is read in by a computational and control device 80. To this end, software which carries out the image recognition and motion tracking schematically shown in FIG. 6 through FIG. 8, is programmed into the mobile terminal device, or more precisely, into computational device 80. Subsequently, computational and control device 80 generates control signals 82 with which all seven piezoelectric actuators 14, 16, 18, 42, 44, 46, 48, which together form the mechanical compensating device 84, are controlled independently of each other in such a manner that, through the thereby produced two-dimensional tilting and one-dimensional rotation of CCD chip 10, the image of the face is moved and rotated back to the same position as in image 1 to the greatest possible extent and as far as is feasible within the limits of the stroke of the actuators. Exactly one control signal which is independent of the respective other control signals is used for each piezoelectric actuator.

Advantageously, because of the software-based image stabilization, there is no need for acceleration sensors.

The stabilization device is installed, for example, in mobile terminal devices, in particular, DECT-, GSM-, or UMTS-standard mobile video telephones, and is part of an otherwise known camera system.

Since the image recognition software is advantageously capable of detecting even very small movements, it is easily possible to distinguish conscious from unconscious movements. This is also done electronically using software.

This allows movements with small differential angles to be interpreted by the computational device as unwanted movements, and thus, as shake, and to be compensated for using the micromechanical stabilization method described above. Movements with large differential angles are interpreted by the computational device as conscious movements and are therefore not compensated for.

Once the software detects a movement that is interpreted as being unwanted, CCD chip 10, which records the image, is appropriately re-oriented to compensate for the movement of the camera.

It will be apparent to one skilled in the art that the above-described embodiments are meant to be exemplary, and that the present invention is not limited thereto, but can be varied in many ways without departing from the spirit thereof.

What is claimed is:

1. An image stabilization device comprising:
   a plurality of micromechanical actuators;
   a housing having at least two walls disposed substantially perpendicular to one another, at least two of the walls having at least one of the plurality of micromechanical actuators attached thereto and extending perpendicular therefrom;
   an image recording sensor operative to generate image data of an image, the image recording sensor being at least partially surrounded by the housing, the image recording sensor being suspendedly mounted to the micromechanical actuators, the image recording sensor being movably and suspendedly attached to the housing by the actuators; and
   a computational device operative to receive and process the image data generated by the image recording sensor, the computational device including a detection device operative to perform a shake detection image analysis on the image data to detect changes between two images in a time sequence of the image data and determine differential angles from the time sequence of the image data by tracking a position of a reference point between the two images in a time sequence of the image data so as to describe a present movement of the image recording sensor, the computational device being operative to immediately use the detected changes and determined differential angles between the two images describing the present movement of the image recording sensor to generate control signals for controlling the micromechanical actuators so as to mechanically move the image recording sensor in a manner to actively counteract the present shake and to stabilize the image.

2. The image stabilization device as recited in claim 1 wherein the image is generated using a hand-holdable mobile video telephone.

3. The image stabilization device as recited in claim 1 wherein the plurality of actuators includes a first group of the actuators, the actuators of the first group being operative to perform a linear movement along a respective longitudinal axis, the actuators of the first group being disposed with their respective longitudinal axes transverse to an image plane of the image recording sensor so that when actuated, the actuators of the first group tilt the image recording sensor in a direction transverse to a normal of the image plane.

4. The image stabilization device as recited in claim 3 wherein the actuators of the first group are disposed on a back side of the image recording sensor.

5. The image stabilization device as recited in claim 3 wherein the image recording sensor includes a CCD chip, the actuators of the first group being integrated into the CCD chip on a back side of the CCD chip.

6. The image stabilization device as recited in claim 3 wherein the first group of actuators includes at least three actuators disposed on a back side of the image recording sensor so that when actuated, the first group of actuators effect two-dimensional timing of the image recording sensor in a direction transverse to the normal of the image plane.

7. The image stabilization device as recited in claim 1 wherein the plurality of actuators includes a second group of actuators, the actuators of the second group each being operative to perform a linear movement along a respective longitudinal axis transverse to a normal of an image plane of the image recording sensor so as to rotate the image recording sensor about the normal of the image plane.

8. The image stabilization device as recited in claim 7 wherein the image recording sensor includes a plurality of side surfaces extending transversely to the image plane, the actuators of the second group being suspendedly attached to the side surfaces.

9. The image stabilization device as recited in claim 8 wherein:
the plurality of side surfaces includes four side surfaces;
the image recording sensor includes a substantially rectangular shape in the image plane; and
the second group of actuators includes at least four actuators each suspended at a respective end of a respective one of the plurality of side surfaces, each of the actuators of the second group being disposed with their respective longitudinal axes extending parallel to a respective adjacent side surface of the plurality of side surfaces so that when actuated, the at least four actuators effect rotation of the image recording sensor about the normal of the image plane, and
wherein a direction of the effected rotation is dependent upon a direction of the linear movement performed by each of the at least four actuators.

10. The image stabilization device as recited in claim 1 wherein the plurality of actuators includes a first and second group of actuators, the actuators of the first group being disposed perpendicularly to the actuators of the second group, so that when actuated, the actuators of the first group tilt the image recording sensor in a direction transverse to a normal of an image plane, and when actuated, the actuators of the second group rotate the image recording sensor about the normal of the image plane.

11. The image stabilization device as recited in claim 1 wherein the control signals include electrical control signals, an independent control signal being generated for each actuator.

12. The image stabilization device as recited in claim 1 wherein the actuators include piezoelectric elements that are directly driven by the control signals.

13. The image stabilization device as recited in claim 1 wherein the image recording sensor is directly attached to the housing by the actuators.

14. The image stabilization device as recited in claim 1 wherein the detection device is operative to make a distinction between wanted and unwanted movements based on a size of the differential angles and predefined decision criteria so that only unwanted movements are counteracted.

15. The image stabilization device as recited in claim 1 wherein the detection device is operative to perform a face recognition.

16. The image stabilization device as recited in claim 15 wherein detection device is operative to perform the face recognition by selecting a plurality of prominent facial features from a group of facial features including an eye, a nose, and a mouth of a face so as to assign a point of reference to a recognized facial feature, at least one reference point being calculated from the point of reference, the stabilizing the image being performed by tracking the at least one reference point in each image of the image data.

17. The image stabilization device as recited in claim 1 wherein the position is measured as a position vector of the reference point.

18. The image stabilization device as recited in claim 17 wherein a measured first position vector of the reference point is taken from a first recorded image of a video stream and a measured second position vector of the reference point is taken from a second recorded image of the video stream, a displacement vector being determined by subtracting either the first position vector or the second position vector from the other of the first position vector or the second position vector, the computational device using the displacement vector to generate the control signals.

19. The image stabilization device as recited in claim 1 wherein the computational device is operative to generate, using the detected changes and determined differential angles describing the present movement of the image recording sensor, control signals for controlling the micromechanical actuators so as to mechanically move the image recording sensor in a manner to actively counteract the present shake and to stabilize the image without electronically modifying the image data.

20. A method for image stabilization comprising: providing a plurality of micromechanical actuators; providing a housing having at least two walls disposed substantially perpendicular to one another, at least two of the walls having at least one of the plurality of micromechanical actuators attached thereto and extending perpendicular therefrom; generating image data of an image using an image recording sensor suspendedly mounted to the micromechanical actuators, the image recording sensor being at least partially surrounded by the housing the image recording sensor being movably and suspendedly attached to the housing the actuators; receiving and processing the generated image data using a computational device including a detection device by performing a shake detection image analysis on the image data to detect changes between two images in a time sequence of the image data and determine differential angles from the time sequence of the image data by tracking a position of a reference point between the two images in a time sequence of the image data so as to describe a present movement of the image recording sensor; and immediately using the detected changes and determined differential angles between the two images describing the present movement of the image recording sensor to generate control signals for controlling the micromechanical actuators so as to mechanically move the image recording sensor in a manner to actively counteract the present shake and to stabilize the image.

21. The method as recited in claim 20 wherein the plurality of micromechanical actuators and the image recording sensor are disposed in a hand-holdable mobile video telephone.

* * * * *